United States Patent
Yip et al.

(10) Patent No.: US 7,659,017 B2
(45) Date of Patent: Feb. 9, 2010

(54) DRYING METHOD FOR FUEL CELL STACKS

(75) Inventors: Pui Yan Joyce Yip, Richmond (CA); Julie Bellerive, Burnaby (CA); Stephen J. Lee, Vancouver (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 839 days.

(21) Appl. No.: 11/061,854

(22) Filed: Feb. 17, 2005

(65) Prior Publication Data

US 2006/0183005 A1     Aug. 17, 2006

(51) Int. Cl.
*H01M 8/00* (2006.01)
*H01M 2/02* (2006.01)

(52) U.S. Cl. .............. 429/12; 429/13; 429/34

(58) Field of Classification Search .......... 429/12, 429/13, 34
See application file for complete search history.

(56) References Cited

U.S. PATENT DOCUMENTS

| | | | |
|---|---|---|---|
| 5,763,113 A | 6/1998 | Meltser et al. | 429/13 |
| 5,945,229 A | 8/1999 | Meltser | 429/13 |
| 6,103,409 A | 8/2000 | DiPierno Bosco et al. | 429/13 |
| 6,358,637 B1 | 3/2002 | Fuss | 429/12 |
| 6,479,177 B1 * | 11/2002 | Roberts et al. | 429/13 |
| 2003/0180586 A1 | 9/2003 | Hagans et al. | 429/13 |
| 2003/0186093 A1 | 10/2003 | St-Pierre et al. | 429/13 |
| 2004/0018402 A1 | 1/2004 | Takahashi | 429/13 |
| 2004/0033395 A1 | 2/2004 | Thompson | 429/13 |
| 2005/0075240 A1 * | 4/2005 | Yamamoto | 502/101 |

FOREIGN PATENT DOCUMENTS

| | | |
|---|---|---|
| EP | 1 239 530 A2 | 9/2002 |
| EP | 1239530 A2 * | 9/2002 |
| JP | 5-47394 | 2/1993 |
| JP | 10-92453 | 4/1998 |
| JP | 2001/319673 | 11/2001 |
| JP | 2002/208421 | 7/2002 |

OTHER PUBLICATIONS

U.S. Appl. No. 11/019,126, filed, Dec. 21, 2004, Bach et al.

* cited by examiner

*Primary Examiner*—Patrick Ryan
*Assistant Examiner*—Karie O'Neill
(74) *Attorney, Agent, or Firm*—Crowell & Moring LLP

(57) ABSTRACT

For various reasons, it can be desirable to subject fuel cells to drying procedures. In solid polymer electrolyte fuel cells for instance, drying may be carried out prior to storing at below freezing temperatures, or to recover cell performance lost following freeze/thaw events. An improved drying method involves drying the cell uniformly throughout. That is, the drying power over the length of the fuel cell is adjusted to be essentially uniform. This can be accomplished by using an appropriate set of operating conditions. The improved drying method can improve the lifetime of the fuel cell.

10 Claims, 4 Drawing Sheets

DRYING METHOD FOR FUEL CELL STACKS

BACKGROUND OF THE INVENTION

1. Field of the Invention

The invention relates to improved methods for drying fuel cells, particularly solid polymer electrolyte fuel cells, which methods can improve cell lifetime.

2. Description of the Related Art

Fuel cell systems are presently being developed for use as power supplies in a wide variety of applications. Fuel cells convert fuel and oxidant reactants to generate electric power and reaction products. They generally employ an electrolyte disposed between cathode and anode electrodes. A catalyst typically induces the desired electrochemical reactions at the electrodes. The presently preferred fuel cell type for portable and motive applications is the solid polymer electrolyte (SPE) fuel cell which comprises a solid polymer electrolyte and operates at relatively low temperatures.

SPE fuel cells employ a membrane electrode assembly (MEA) which comprises the solid polymer electrolyte or ion-exchange membrane disposed between the cathode and anode. Each electrode contains a catalyst layer, comprising an appropriate catalyst, located next to the solid polymer electrolyte. The catalyst is typically a precious metal composition (e.g., platinum metal black or an alloy thereof) and may be provided on a suitable support (e.g., fine platinum particles supported on a carbon black support). The catalyst layers may contain ionomer similar to that used for the solid polymer membrane electrolyte (e.g., Nafion®). The electrodes may also contain a porous, electrically conductive substrate that may be employed for purposes of mechanical support, electrical conduction, and/or reactant distribution, thus serving as a fluid diffusion layer. Flow field plates for directing the reactants across one surface of each electrode or electrode substrate, are disposed on each side of the MEA. In operation, the output voltage of an individual fuel cell under load is generally below one volt. Therefore, in order to provide greater output voltage, numerous cells are usually stacked together and are connected in series to create a higher voltage fuel cell series stack.

During normal operation of a SPE fuel cell, fuel is electrochemically oxidized at the anode catalyst, typically resulting in the generation of protons, electrons, and possibly other species depending on the fuel employed. The electrons travel through an external circuit providing useable power and then electrochemically react with protons and oxidant at the cathode catalyst to generate water reaction product. The protons are conducted from the reaction sites at which they are generated, through the electrolyte, to react with the oxidant and electrons at the cathode catalyst.

Because the ionic conductivity in typical SPE fuel cell electrolytes increases with hydration level, the fuel cell stacks are usually operated in such a way that the membrane electrolyte is as fully saturated with water as is possible without "flooding" the cells with liquid water ("flooding" refers to a situation where liquid water accumulates and hinders the flow and/or access of gases in the fuel cell). In this way, maximum power output can be provided during normal operation. However, if flooding should occur, a drying procedure may be employed (e.g., as disclosed in U.S. Pat. No. 6,103,409) to correct the problem. The detection of a flooding problem may be accomplished in various ways (e.g., as disclosed in U.S. Pat. No. 5,763,113 or U.S. Pat. No. 5,945,229).

In some fuel cell applications, the demand for power can essentially be continuous and thus the stack may rarely be shutdown (e.g., for maintenance). However, in many applications (e.g., as an automobile engine), a fuel cell stack may frequently be stopped and restarted with significant storage periods in between. During shutdown and storage at below freezing temperatures, a significant amount of liquid water may condense in the stack and freeze. The presence of ice inside can result in permanent damage to the stack. Even if such damage is avoided, the presence of ice can still hinder subsequent startup. Thus, various drying procedures may be employed to reduce the water content prior to shutting down the stack for storage (e.g., as disclosed in U.S. Pat. No. 6,479,177, U.S. Pat. No. 6,358,637, or US 2003/0186093). Alternatively, drying procedures may be employed on startup (e.g., as disclosed in US 2004/0033395 or JP 2003-151598).

Repeated shutdowns at below freezing temperatures have been found to adversely affect fuel cell performance. However, it has also been found that stack performance can be recovered via the use of an appropriate drying method. For instance, one such method is disclosed in US 2003/0180586 in which the drying is accomplished when the stack is not operating.

While drying procedures are frequently employed in fuel cells, such procedures may damage the fuel cell and hence limit its lifetime. Accordingly, improved drying procedures are therefore desired.

BRIEF SUMMARY OF THE INVENTION

Use of a drying procedure in which the fuel cell is dried uniformly throughout has been found to reduce damage and extend the lifetime of the cell. The fuel cell typically comprises a reactant flow field channel having an inlet and an outlet. Herein, the fuel cell length is defined by the span from the channel inlet to the channel outlet. The improved method comprises operating the fuel cell such that the drying power over this fuel cell length is essentially uniform.

In the method, the variation in drying power is less than that conventionally employed and thus is less than about 0.05 $(Mol/sec)/(A/cm^2)$. Typically the variation in drying power is much less (e.g., one or two orders of magnitude less or less than about 0.005 $(Mol/sec)/(A/cm^2)$, or more typically less than about 0.0005 $(Mol/sec)/(A/cm^2)$). In order to remove water at a reasonable rate, the absolute drying power is often significant (for instance, more than about $10^{-4}$ Mol/sec). In the method, the drying power as a function of length can be determined by calculation. Various operating parameters (e.g., current density, reactant humidities and flow rates, etc.) are adjusted in order to obtain a desired drying power profile.

The method can be readily implemented in a solid polymer electrolyte fuel cell comprising a perfluorosulfonic acid polymer membrane electrolyte and comprising flow field channels for two reactants and a coolant in which the direction of flow for the oxidant reactant and coolant are opposite to that of the fuel reactant. In a complete fuel cell system, a control system may be employed that is configured to operate the fuel cell according to the inventive method.

More specifically, the method can be employed to recover performance in a fuel cell following a freeze/thaw event. In this case, the drying process may be terminated based on the relative humidity in the oxidant exhaust (e.g., when the relative humidity reaches 80%). The control system therefore can comprise a suitable relative humidity sensor in the oxidant exhaust.

DETAILED DESCRIPTION OF THE INVENTION

Figure 1:
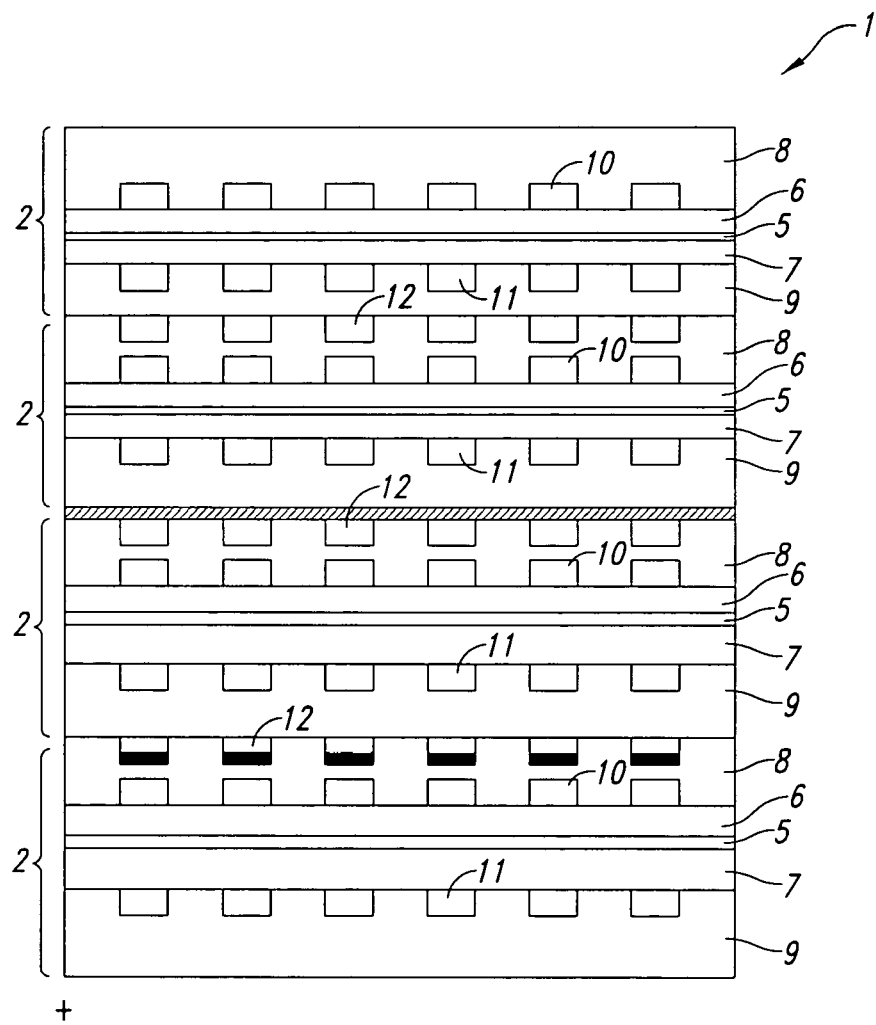
FIG. 1 is a schematic diagram of a solid polymer electrolyte fuel cell series stack.

The inventive drying method is particularly suited for use in solid polymer electrolyte fuel cell stacks. An exemplary stack is shown schematically in a side cross-sectional view in FIG. 1. Stack 1 comprises a plurality of stacked cells 2. Each cell comprises a solid polymer electrolyte membrane 5. Suitable catalyst layers (not shown) serve as the anode and cathode in each cell and are applied to opposing faces of each membrane 5. Each cell also comprises an anode gas diffusion layer 6 and a cathode gas diffusion layer 7. And, adjacent the gas diffusion layers 6, 7 in each cell are a fuel (anode) flow field plate 8 and an oxidant (cathode) flow field plate 9. Each plate comprises fuel flow field channels 10 and oxidant flow field channels 11 respectively. As depicted, each fuel flow field plate 8 also contains coolant flow field channels 12. In this embodiment, channels 10, 11, and 12 are all linear, parallel, and run normal to the plane of the paper. Typically, negative and positive bus plates (not shown) and a pair of compression plates (not shown) are also provided at either end of the stack. Fluids are supplied to and from the reactant and coolant flow fields via various ports and manifolds (not shown).

Figure 2:
FIG. 2 is a design for a flow field plate made of a series of linear parallel channels, which design was used in the fuel cell stacks of the Examples.

FIG. 2 shows a top view of the oxidant flow field plate 9. Oxidant enters through inlet manifold opening 16, travels through oxidant channels 17, and exhausts out manifold opening 18. As shown, the direction of flow of the oxidant and coolant are the same, while the direction of the fuel is opposite thereto. All the reactant and coolant channels however run parallel to the length direction of the cell. Such a linear, counter-flow cell construction is desirable for use with the inventive method as it allows for a relatively simpler calculation of appropriate operating parameters for purposes of obtaining a suitably uniform drying power profile.

At certain times during regular use, it may be desirable to subject the stack to a drying procedure (e.g., for shutdown, startup, or for recovery purposes). Prior art drying methods however result in quite non-uniform drying over the fuel cell length. That is, certain regions in the stack get dried faster than others. For instance, when feeding dry oxidant gas through the cells at low or zero load, the regions around the oxidant inlets typically get dried to a much greater extent than elsewhere in the cells (the dry gas entrains water as it moves through the cells and thus the drying power of the gas is reduced). Such uneven, localized drying has empirically been observed to result in damage to the typical membrane electrolytes in these cells. In the preceding instance, the membrane electrolyte in the region around the oxidant inlet for instance develops holes thereby allowing reactant gases in the cells to mix. Significant leaks of this kind generally result in stack failure. Hence such damage reduces the lifetime of the stack. However, using a drying procedure in which the drying power throughout the stack is relatively uniform can significantly reduce this kind of damage and hence improve the lifetime of the stack.

A drying power model is provided below for calculating the drying power along the length of the fuel cell. Use of the model allows for a suitable set of operating parameters to be determined for a given cell construction. The operating parameters which can be varied in order to vary the drying power include: the reactant operating pressures, pressure drops, flow rates, humidification level, and stoichiometry, and stack operating load.

Drying Power Model

The following employs theory previously disclosed in U.S. patent application Ser. No. 11/019,126 filed Dec. 21, 2004. The disclosure of that patent application is incorporated herein by reference in its entirety.

A model has been created to determine the drying power profiles for given fuel cell construction and operating conditions. In the model, water is removed from the cell in the flowing reactant gases. The local drying power is thus a function of the difference between the local water carrying capacity of the reactant gases and the actual local water content in the reactant gases. The following illustrates how the drying power profile can be determined for the cathode (oxidant) side of a fuel cell. The drying power profile for the anode (fuel) side can be determined in a like manner. The total drying power in the fuel cell is then the combination of cathode and anode drying powers.

In the following, a solid polymer electrolyte fuel cell having straight oxidant (air), fuel (hydrogen), and coolant (antifreeze solution) flow field channels as shown in FIG. 2 is assumed. The fuel flows counter to the oxidant and coolant. However, the model can be readily modified by those skilled in the art in order to derive equivalent equations for other embodiments (e.g., in which certain fluids flow in an opposite direction, or in which certain fluids flow in a serpentine manner). The model assumes no significant interaction or exchange of water from the anode fuel stream through the electrolyte to the cathode oxidant stream, or conversely, exchange of water from the cathode to anode stream. For calculation purposes, the cell is split into several discrete segments along its oxidant channel length, and the relevant parameters are determined for each segment. Using this technique, the drying power at each segment along the oxidant channel length can be calculated. In the Examples that follow, the cell was split into one hundred segments and calculations were carried out using Excel software.

Oxygen Flow

The dry oxygen gas flow into the fuel cell is given by $n_{g,inlet}$. Oxygen is consumed along the length of the cell as a result of the electrochemical reactions taking place. It is given by the following equation (units in moles per second):

$$n_{g,inlet} = \frac{I}{4F} \cdot \frac{\lambda}{\% \, O_2} \quad (1)$$

where I is load current in Amperes, $\lambda$ is air stoichiometry (i.e., the ratio of amount of air supplied at the oxidant inlet to that consumed electrochemically in the cell), F is Faraday's constant or 96485 C/mol, % $O_2$ is the concentration of oxygen in the oxidant (air in this case), and the constant 4 represents the two electrons that are transferred for each molecule of hydrogen in the following anode and cathode half reactions, $2H_2 \rightarrow 4H^+ + 4e^-$ and $4H^+ + 4e^- + O_2 \rightarrow 2H_2O$ respectively. In the following overall stoichiometric fuel cell reaction, exactly two moles of hydrogen are provided for each mole of oxygen:

$$2H_2 + O_2 \rightarrow 2H_2O \qquad (2)$$

The dry oxygen gas flow at segment m along the cell, $n_{g,m}$, is given by the dry oxygen gas flow from the previous segment, $n_{g,m-1}$, minus the amount of oxygen consumed (units again in moles per second):

$$n_{g,m} = n_{g,m-1} - \frac{I \cdot \% \text{ load}}{4F} \qquad (3)$$

where % load is the fraction of electrical load produced at a given segment. Because uniform load production is assumed, % load equals 1% for a calculation involving 100 segments. The inlet condition ngo used when calculating the dry oxygen gas flow for the first segment is simply that provided at the oxidant inlet of the cell, $n_{g,inlet}$, as defined in Equation (1). As oxygen is consumed in the cell, the dry oxygen gas flow decreases along the oxidant channel length.

Temperature

The temperature, T, typically rises with length along the coolant channels and hence along the cell because of the heat created from the exothermic reaction between the hydrogen and oxygen reactants. This heat warms up the supplied reactant and coolant fluids and evaporates water. In the model, the temperature is assumed to change linearly between the measured inlet and outlet temperatures of the cell. dT is defined to be the difference between the inlet and outlet temperature of the coolant.

Oxidant Pressure

The oxidant (air) pressure drop in the cathode flow field is assumed to increase linearly as the air passes through the flow field channels (units are bar). Thus:

$$P = (P_{inlet} - x \cdot P_d) \qquad (4)$$

where $P_{inlet}$ is the air pressure at the oxidant inlet, x is the fraction of the distance along the length of the cell, and $P_d$ is the pressure drop along the entire cell. The pressure along the cell decreases as it is subjected to more pressure drop.

Water Flow

The water flow in the cathode flow field, $n_v$ in moles per second, can be derived from the definition of relative humidity, RH, which is the ratio of the mole fraction of water vapour in the oxidant mixture, $n_v$, to the mole fraction of water vapour in a saturated mixture at the same temperature and pressure, $n_{sat}$. The vapour is considered to be an ideal gas (hence PV=nRT) so the following correlation can be made:

$$RH = \frac{n_v}{n_{sat}} = \frac{P_v}{P_{sat}} \Rightarrow$$

$$P_v = P_{sat} \cdot RH \qquad (5)$$

where $P_v$ is the partial pressure of the water vapour in the oxidant stream and $P_{sat}$ is the saturation pressure of the vapour at the same temperature.

From partial pressure laws and substituting vapour partial pressure as defined above, the partial pressure of the dry oxidant gas, $P_g$, is given by:

$$P = P_v + P_g \Rightarrow$$

$$P_g = P - P_v = P - P_{sat} \cdot RH \qquad (6)$$

where P is the operating pressure of the air.

Finally, water flow can be derived using Dalton's law of partial pressures and the ideal gas law:

$$\frac{n_v}{n_g} = \frac{P_v}{P_g} \Rightarrow \qquad (7)$$

$$n_v = n_g \cdot \frac{P_v}{P_g} = n_g \cdot \frac{(P_{sat} \cdot RH)}{(P - P_{sat} \cdot RH)}$$

Subsequently, water flow at the inlet of the fuel cell, $n_{v,inlet}$, is given by the following equation (units again are moles per second):

$$n_{v,inlet} = n_{g,inlet} \cdot \frac{(P_{sat,inlet} \cdot RH_{inlet})}{(P_{inlet} - P_{sat,inlet} \cdot RH_{inlet})} \qquad (8)$$

The water flow at segment m along the fuel cell, $n_{v,m}$, is the sum of the water flow from the previous segment, $n_{v,m-1}$, plus the water produced in segment m:

$$n_{v,m} = n_{v,m-1} + \frac{I \cdot \% \text{ load}}{2F} \qquad (9)$$

where the constant 2 represents the two electrons transferred for each molecule of water produced. The inlet condition $n_{v,0}$ used when calculating the water flow for the first segment is simply the water flow at the inlet of the unit cell, $n_{v,inlet}$, as defined in Equation (7) above. As the air and hydrogen reactants are consumed electrochemically, water is produced, and thus the amount of water flow increases along the oxidant channel length.

Drying Power

The absolute drying power for segment m along the cathode side of the fuel cell, $absW_{drying,m}$ is now given by the difference between the water carrying capability of the oxidant flow and the actual water in the oxidant flow as calculated above. That is, the absolute drying power is the molar flow of saturated water vapour at segment m minus the total water molar flow at segment m (units are moles per second). Thus, $$absW_{drying,m} = n_{sat,m} - n_{v,m} \qquad (10)$$

Water flow was defined in Equation (7) as:

$$n_{sat,outlet} = n_{g,outlet} \cdot \frac{(P_{sat,outlet})}{((P_{inlet} - P_d) - P_{sat,outlet})} \qquad (7)$$

Since $n_{sat}$ is defined as $n_v$ at 100% relative humidity, the saturated water vapour at segment m is given by the following equation:

$$n_{sat,m} = n_{g,m} \cdot \frac{(P_{sat,m})}{((P_m) - P_{sat,m})} \qquad (11)$$

Water vapour saturation pressure, $P_{sat,m}$, is temperature dependent. It is calculated using the empirical equation (equivalent to Standard steam tables; units are bar):

$$\log P_{sat,m} = -2.1794 + 0.02953 T_m - 9.1837 \times 10^{-5} T_m^2 + 1.4454 \times 10^{-7} T_m^3 \qquad (12)$$

where $T_m$ is the temperature at segment m.

From the preceding, the absolute drying power at segment m, $absW_{drying,m}$, is then determined. In the model, it is assumed that the current density throughout the active area, A, of the fuel cell is uniform. Thus, the current density is load/A. Finally, the drying power as expressed in terms of current density is given by:

$$W_{drying,m} = absW_{drying,m}/(\text{load}/A) \qquad (13)$$

The following examples are provided to illustrate certain aspects and embodiments of the invention but should not be construed as limiting in any way.

COMPARATIVE EXAMPLES

Two solid polymer electrolyte fuel cell stacks designed for use as a 85 kW automobile engine were used in this Example. The flow field plate design was similar to that shown in FIG. 2 in which the fuel (hydrogen) and oxidant (air) reactants as well as the coolant (antifreeze solution) were distributed via a series of straight, parallel flow channels and in which the fuel flow was opposite to that of the oxidant and coolant flow. For both the fuel and oxidant, there were 36 channels in each cell that were 0.63 m long. The active area of an individual cell was 285 cm².

The stacks were tested according to a duty cycle which consisted of cycles of normal operation interspersed with freeze/thaw events. That is, the stacks were turned off from time to time, were frozen, thawed and then operated again. As a result of the freeze/thaw events, some loss in stack performance occurred (manifested as a drop in average stack voltage). To recover the lost performance, the duty cycle therefore also included a drying operation. The drying procedure involved purging the stack with dry reactant gases while operating at low load. Table 1 lists the operating parameters used in the drying procedure. The fuel and oxidant reactants employed were pure hydrogen and air respectively.

TABLE 1

Comparative drying procedure

| Operating Parameter | Value |
| --- | --- |
| Stack current | 0.5 A |
| Coolant temperature | 65° C. |
| Air stoichiometry | 298 |
| Air inlet pressure | 1.1 bara |
| Air dew point | 0° C. |
| Air pressure drop | 0.125 bara |
| Fuel stoichiometry | 18 |
| Fuel inlet pressure | 1.3 bara |
| Fuel dew point | 0° C. |
| Fuel pressure drop | 0.023 barg |

Figure 3:
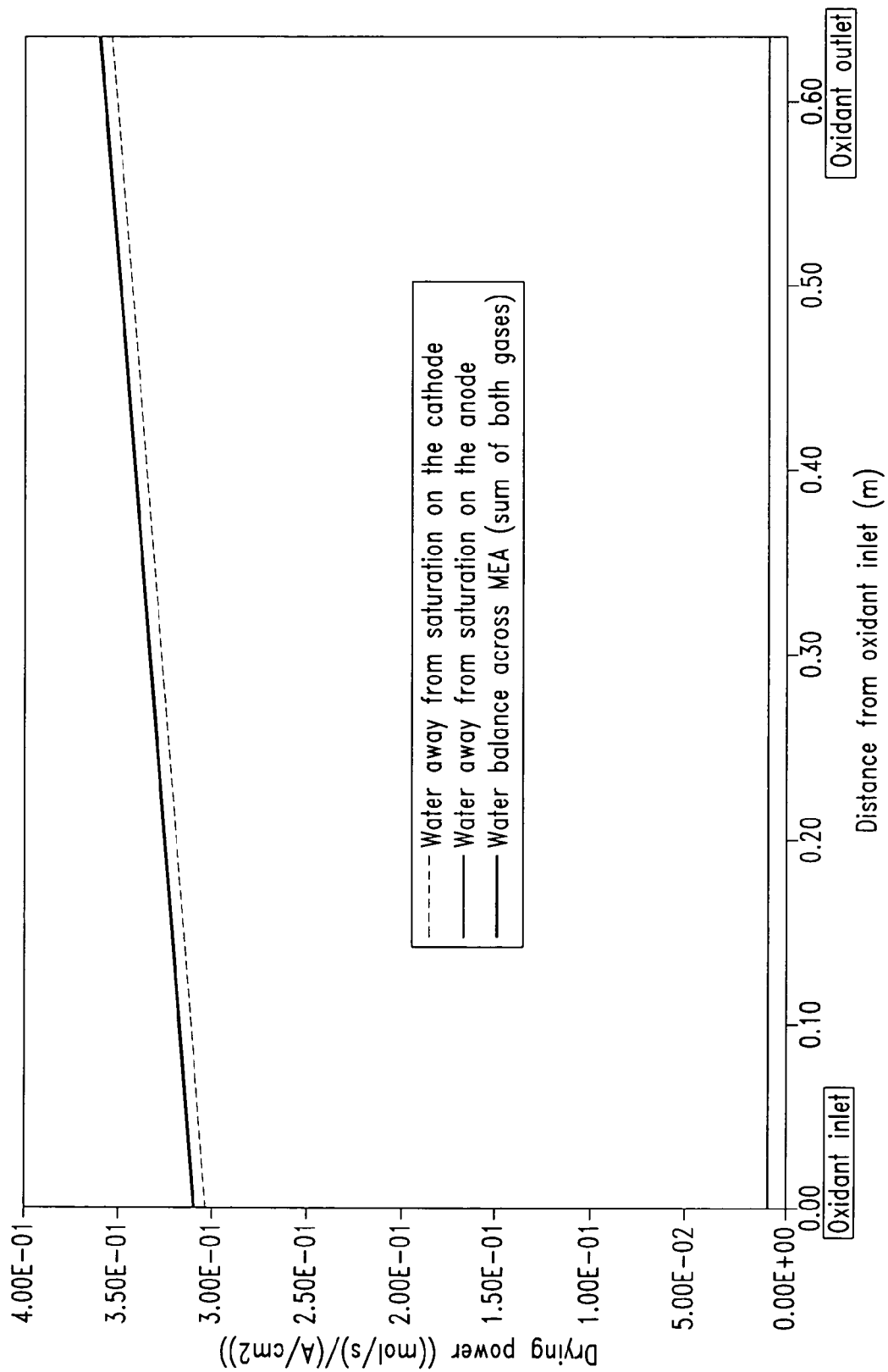
FIG. 3 is the drying power versus fuel cell length profile for the stacks in the Comparative Examples.

The drying power versus fuel cell length profile for this procedure was calculated as described above. FIG. 3 shows the drying power on the cathode and anode sides in the stacks as well as the total drying power. The total drying power in this case varied from about 0.309 to 0.361 (Mol/sec)/(A/cm²) [or about $5.4 \times 10^{-4}$ to $6.3 \times 10^{-4}$ Mol/sec at the given load]. (Note that in FIG. 3, the x axis shows distance along the oxidant channel from inlet to outlet.)

The stacks were tested until they failed. In each case, failure occurred when unacceptable leaks developed and resulted in mixing of the reactant streams within the fuel cell stack. The first stack operated for an integrated total time of 770 hours and had accumulated 684 minutes of drying time. The second stack operated for an integrated total time of 644 hours and had accumulated 583 minutes of drying time. On disassembly, it was noted that the majority of the leakage was due to damage/holes in the membrane electrolyte particularly in the vicinity of the oxidant inlet.

Examples

A fuel cell stack similar to that of the Comparative Example was tested in a like manner except that a drying procedure was used that allowed for very uniform drying throughout the stack. In particular, qualitatively the load used was higher (and hence the reactant stoichiometries were lower for a given reactant flow) and the supplied reactants were humidified more. (Note also that the fuel reactant employed here was a 78% hydrogen/22% nitrogen mixture, which is a composition representative of a system employing a recirculating fuel stream.)

TABLE 2

Inventive drying procedure

| Operating Parameter | Value |
| --- | --- |
| Stack current | 10 A |
| Coolant temperature | 60° C. |
| Air stoichiometry | 10 |
| Air inlet pressure | 1.28 bara |
| Air dew point | 40° C. |
| Air pressure drop | 0.125 bara |
| Fuel stoichiometry | 2.5 |
| Fuel inlet pressure | 1.5 bara |
| Fuel dew point | 55° C. |
| Fuel pressure drop | 0.023 barg |

Figure 4:
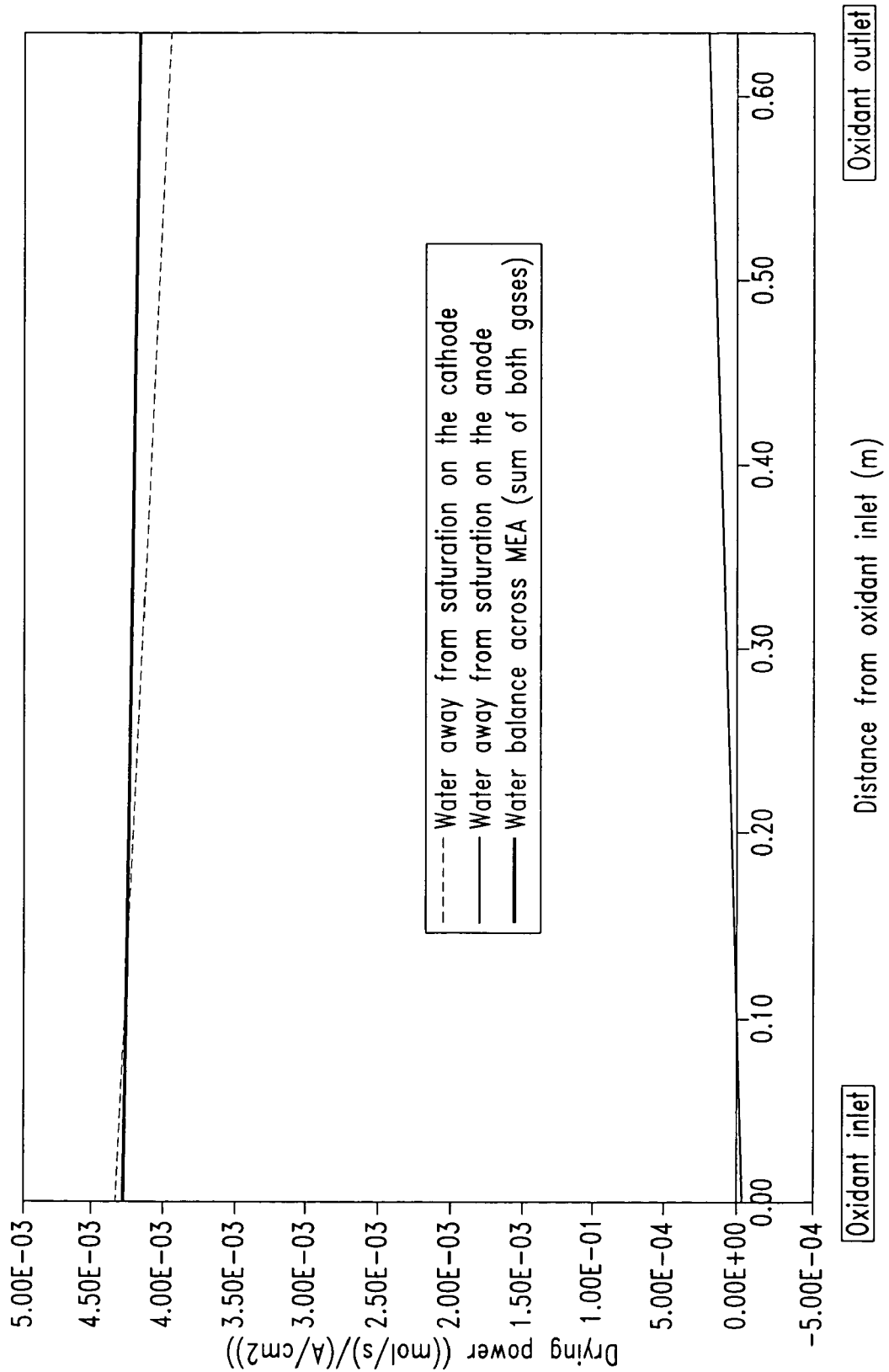
FIG. 4 is the drying power versus fuel cell length profile for the stacks in the Examples.

The drying power versus fuel cell length profile for this procedure was also calculated. FIG. 4 shows the drying power on the cathode and anode sides in the stacks as well as the total drying power. The total drying power in this case varied from about $4.18 \times 10^{-3}$ to $4.29 \times 10^{-3}$ (Mol/sec)/(A/cm²) [or about $1.47 \times 10^{-4}$ to $1.51 \times 10^{-4}$ Mol/sec at the given load].

This stack is also being tested to failure. At this time, it has been operated for an integrated total time of 356 hours and has accumulated 1412 minutes of drying time without failing. The stack was then disassembled and no holes nor any damage were noted in the vicinity of the oxidant inlet.

This Example shows that the stack can tolerate exposure to the inventive drying procedure for much longer than the comparative drying procedure without failure or any apparent associated damage in the vicinity of the oxidant inlet. Thus, the lifetime of the stack would be greatly improved.

Figure 5:
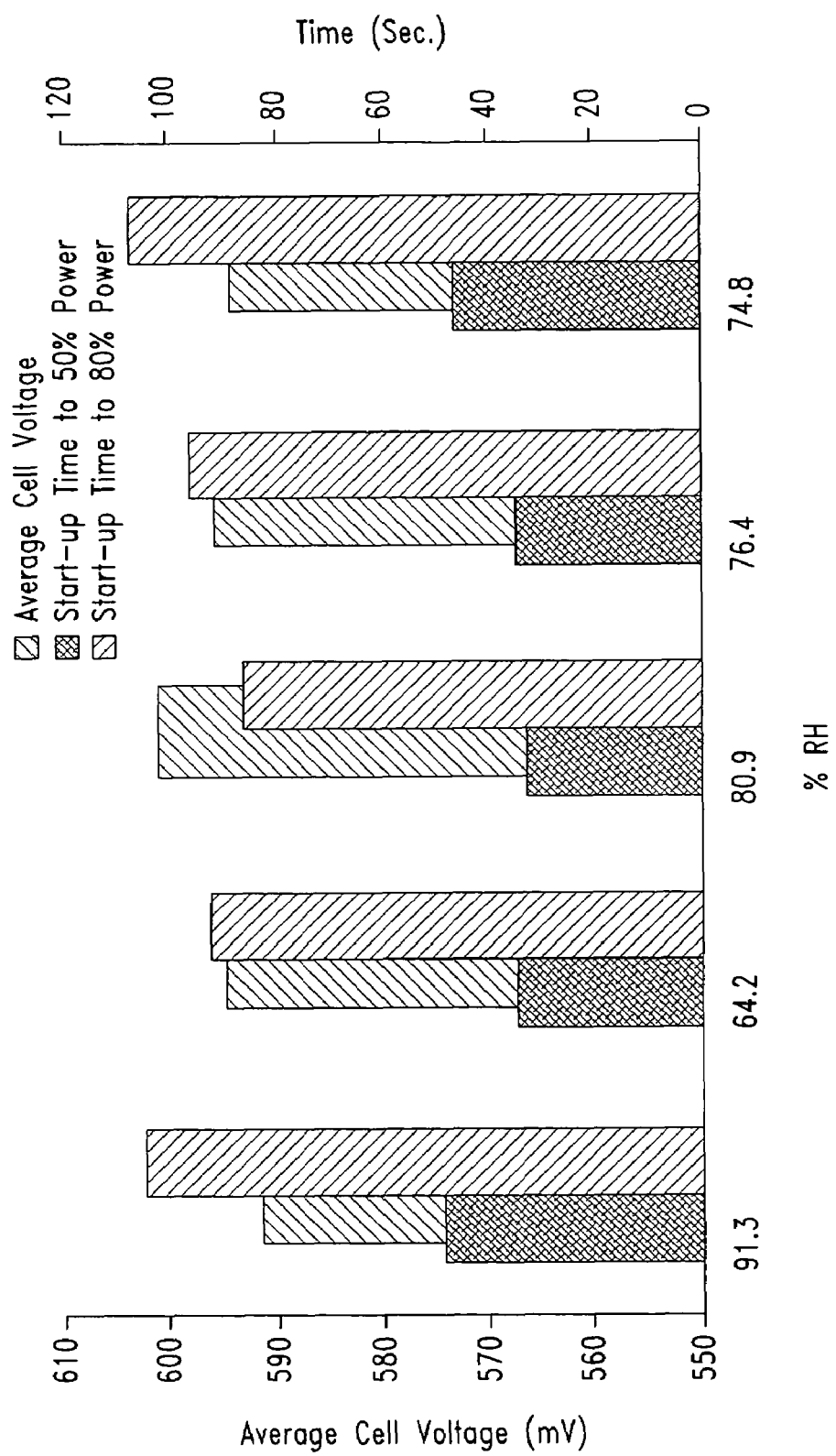
FIG. 5 is a bar chart of the start-up characteristics for a stack in the Examples as a function of the relative humidity measured in the oxidant exhaust at the end of the drying procedure.

Another similar fuel cell stack was operated for several hundred hours initially and was then subjected to similar duty cycle testing which resulted in performance losses after the freeze/thaw events. During the drying procedure however, the relative humidity of the oxidant exhaust was monitored and the drying procedure was continued until a specific relative humidity was reached. Over subsequent cycles, the relative humidity endpoint was varied and the start-up characteristics of the fuel cell stack were recorded. FIG. 5 shows a bar chart of the average fuel cell voltage, and start-up times for the stack to reach 50% and to 80% of its full power capability as a function of the relative humidity in the cathode exhaust before stopping the inventive drying process. As is evident from FIG. 5, the drying procedure that provided the best immediate performance recovery results was that in which drying was halted when the relative humidity was 80% at the oxidant outlet.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

What is claimed is:

1. A method of drying a fuel cell following a normal operating period, the fuel cell comprising a reactant flow field channel having an inlet and an outlet and a fuel cell length defined by the span from the channel inlet to the channel outlet, the method comprising:

operating the fuel cell for a normal operating period;

subsequently varying at least one operating parameter to make total drying power over the fuel cell length vary by less than about 0.05 (Mol/sec)/(A/cm$^2$) said total drying power being a combination of anode and cathode drying power, said at least one operating parameter being selected from the group consisting of: reactant operating pressure, pressure drop, flow rate, humidification level, stoichiometry and stack operating load; and operating the fuel cell for a drying period during which the total drying power over the fuel cell length varies by less than about 0.05 (Mol/sec)/(A/cm$^2$).

2. The method of claim 1 wherein the variation in total drying power over the fuel cell length is less than about 0.005 (Mol/sec)/(A/cm$^2$).

3. The method of claim 2 wherein the variation in drying power over the fuel cell length is less than about 0.0005 (Mol/sec)/(A/cm$^2$).

4. The method of claim 1 wherein the total drying power over the fuel cell length is more than about $10^{-4}$ Mol/sec.

5. The method of claim 1 wherein the fuel cell is a solid polymer electrolyte fuel cell.

6. The method of claim 5 wherein the solid polymer electrolyte is a perfluorosulfonic acid polymer.

7. The method of claim 5 wherein the fuel cell comprises flow field channels for fuel and oxidant reactants and for a coolant and wherein the directions of flow for the oxidant reactant and coolant are opposite to that of the fuel reactant.

8. A method for recovering performance in a fuel cell following a freeze/thaw event comprising drying the fuel cell according to the method of claim 1.

9. The method of claim 8 comprising measuring the relative humidity in the oxidant exhaust and stopping the drying when the relative humidity reaches 80%.

10. A fuel cell system comprising a fuel cell and a control system, the fuel cell comprising a reactant flow field channel having an inlet and an outlet, a coolant channel having a direction of flow opposite to that of the reactant, and a fuel cell length defined by the span from the channel inlet to the channel outlet, wherein the reactant flow field channel and the coolant channel are linear and run parallel to the fuel cell length and the control system is configured to operate the fuel cell normally and subsequently dry the fuel cell by operating the fuel cell such that total drying power over the fuel cell length varies by less than about 0.05 (Mol/sec)/(A/cm$^2$), wherein said total drying power is a combination of anode and cathode drying power, is achieved by varying at least one operating parameter to make the total drying power over the fuel cell length vary by less than about 0.05 (Mol/sec)/(A/cm$^2$), said at least one operating parameter being selected from the group consisting of: reactant operating pressure, pressure drop, flow rate, humidification level, stoichiometry and stack operating load.

* * * * *

UNITED STATES PATENT AND TRADEMARK OFFICE
CERTIFICATE OF CORRECTION

PATENT NO.        : 7,659,017 B2                                          Page 1 of 1
APPLICATION NO. : 11/061854
DATED             : February 9, 2010
INVENTOR(S)       : Yip et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1362 days.

Signed and Sealed this

Twenty-eighth Day of December, 2010

David J. Kappos
*Director of the United States Patent and Trademark Office*